Sept. 27, 1966     J. R. FUESLEIN ETAL     3,274,747
METHOD OF SEALING TUBING
Original Filed Aug. 14, 1962
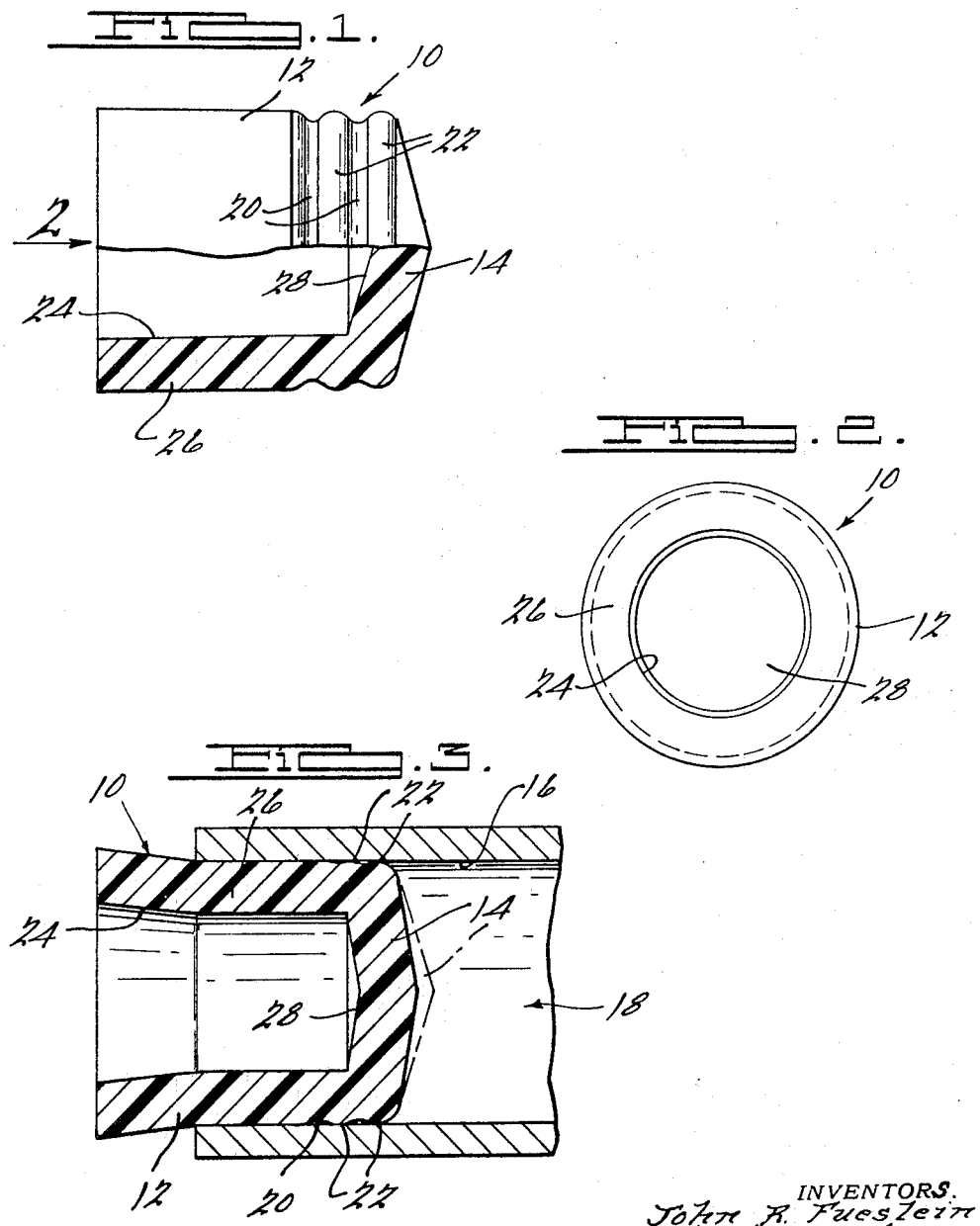

United States Patent Office 3,274,747
Patented Sept. 27, 1966

3,274,747
METHOD OF SEALING TUBING
John R. Fueslein, Jeddo, and Robert R. Rader, Port Huron, Mich., and Edward C. Roper, Springdale, Conn., assignors to Mueller Brass Co., Port Huron, Mich., a corporation of Michigan
Original application Aug. 14, 1962, Ser. No. 216,841, now Patent No. 3,200,984, dated Aug. 17, 1965. Divided and this application Aug. 14, 1964, Ser. No. 389,597
4 Claims. (Cl. 53—22)

The present invention broadly relates to sealing means for tubular members and, more particularly, to an improved sealing plug particularly adapted to be employed in conjunction with tubular members such as metallic tubing and to an improved method of protecting the interior of such tubular members from contamination during transit and storage. This application is a division of the applicants' copending application, Serial No. 216,841, filed August 14, 1962, now Patent No. 3,200,984 issued August 17, 1965.

Apparatus of the general type employing tubular members in a fluid system, such as air conditioning and refrigeration apparatus, is in widespread industrial, commercial and residential use, and in apparatus of this general type it is important that the components of the fluid system, including the tubular members, be maintained in a substantially clean condition free from undesirable deposits, particles and deleterious contaminating fluids such as moisture prior to the assembly of the system in order to prevent the introduction of such foreign matter into the fluid system as may cause malfunction or erratic operation of the system. Although heretofore it has been the practice to thoroughly clean the tubular members at the time they are manufactured, a continuing and heretofore unresolved problem has been encountered as a result of the introduction of contaminating materials into the tubular members during transit and while such members are stored prior to the time they are assembled in the air conditioning or refrigeration system. Consequently, it has been necessary heretofore to again thoroughly clean the interior surfaces of the tubular members and to remove moisture therefrom at the site of the final assembly of the system with a resultant increase in the cost of the manufacturing and assembly of the apparatus.

It is accordingly a primary object of the present invention to provide an improved sealing plug for tubular members and an improved method of sealing such members after cleaning whereby the interiors thereof are maintained in a substantially clean condition for indefinite periods of time during shipment and storage prior to use.

Another object of the present invention is to provide an improved sealing plug construction of a resilient and deformable nature which can be simply and quickly removably installed in the ends of tubular members providing a pressure type fluid seal which serves to prevent the entrance of undesirable contaminating materials into the interior of the tubular member.

A further object of the present invention is to provide an improved sealing plug construction which incorporates novel sealing means which on application of pressure thereto promotes more perfect sealing of the plug against the wall surfaces of a bore in which it is removably disposed.

Still another object of the present invention is to provide a unique method of maintaining the interior of tubular members in an uncontaminated state for indefinite periods of time thereby avoiding the necessity of cleaning such tubing at the job site prior to installation.

Yet another object of the present invention is to provide a method of maintaining the interior of tubular articles in a clean, uncontaminated state for indefinite periods of time enabling the article to be initially cleaned in effective cleaning apparatus at the point of manufacture and in which clean condition the interior of the tube is maintained until its use.

The above as well as other objects and advantages of the present invention will become apparent from the following description, the appended claims and the accompanying drawings, wherein:

FIGURE 1 is a side elevation view of an improved sealing plug embodying the present invention, with portions thereof shown in section;

FIG. 2 is an end elevation view of the sealing plug shown in FIG. 1 as viewed in the direction of the arrow indicated at 2, and FIG. 3 is a longitudinal, sectional view of the sealing plug shown in FIG. 1, showing the same disposed within the interior of one end of a tubular member and in a deformed sealing condition against the inner surfaces thereof.

Referring now in detail to the drawings, a unitary sealing plug, generally designated 10, is illustrated embodying the preferred features comprising the present invention. The plug 10 includes a body portion 12 having an exterior wall which is of a substantially cylindrical configuration. In the specific embodiment shown in the drawings the peripheral surface of the sealing plug is provided with a slight, substantially uniform taper throughout the length thereof. The provision of a slight taper on the peripheral surface of the sealing plug is not necessary to achieve satisfactory sealing characteristics of the sealing plug but is sometimes provided to facilitate extraction of the plug from a mold or die in which it is formed. The plug 10 also includes a conical end wall 14 which is integral with the smaller end of the body portion 12, the apex of the cone projecting axially outwardly from the body portion and substantially coinciding with the longitudinal axis of the body portion. At least one and preferably a plurality of spaced grooves 20 are provided around the periphery of the body portion 12 adjacent the end wall 14 as best seen in FIGURE 1. The grooves 20 are spaced longitudinally of the body portion and form sealing beads or ribs 22, the outer surfaces of the sealing ribs preferably having a convex configuration facilitating compression thereof in a manner as shown in FIGURE 3 so as to assure intimate contact with the inner surface of a bore when the sealing plug is inserted therein.

The body portion 12, including the ribs 22, and the conical end wall 14 are composed of a resilient deformable material enabling flexing and deformation of the sealing plug when it is inserted within a circular bore such as a bore 16 of a tuble 18 as shown in FIGURE 3. Materials possessing the requisite resiliency and flexibility include natural and synthetic rubbers, as well as synthetic plastic materials such as polymers and copolymers of vinyl base plastics, polyethylene, polypropylene and the like. One plastic material which has been found suitable comprises a vinyl plastic available from the B. F. Goodrich Chemical Co. When natural or synthetic rubber is employed, it is preferred that it be substantially devoid of any free sulfur which has a tendency to attack the surfaces of copper or copper alloy tubing against which the sealing plug may be disposed. The rubber is also preferably of the self sealing type to enable puncture and self sealing of the plug during pressurization of the interior of the tubing in a manner subsequently to be described. A rubber formulation which has been found eminently satisfactory for this purpose preferably has a durometer reading of about 65 to about 75.

The resiliency and deformability of such materials enables the sealing plug to be inserted within a circular bore in tight frictional contact with the inner surface thereof facilitating frictional engagement thereof with such inner surface and providing a substantially fluid-type seal therebetween. Moreover, the resilient characteristics of the material enables the plug to conform to slight surface irregularities which may exist along the surface of the bore assuring intimate sealing contact of the surfaces of the plug with the surface of the bore.

The outer substantially cylindrical surface of the body portion 12 as hereinbefore mentioned, may be provided with a slight longitudinal taper which facilitates removal or extraction of the sealing plug from a mold or die and also facilitates wedging and compression of the sealing plug when it is inserted in a bore to be sealed. Conventionally, when a taper is employed it is preferred that it extend for substantially the entire length of the sealing plug. The angle of such a taper is relatively small and generally tapers of about 1° provide for simple extraction of the plug from a die and provide for satisfactory sealing action.

The oversized diameter of the peripheral surface of the sealing plug relative to the bore in which it is inserted effects deformation of the body of the plug as shown in FIGURE 3 assuring intimate surface contact therewith. For most deformable resilient materials sealing plugs having a peripheral diameter of about 10% greater than the diameter of the bore to be sealed provides sufficient compression of the plug to maintain firm frictional engagement thereof within the bore sufficient to withstand the outward pressure of a fluid within the tubular member being sealed.

Sealing plugs constructed in accordance with the embodiment as shown in the drawing, for example, employed for sealing the ends of tubing and composed of a vinyl plastic has been found eminently satisfactory for sealing tubing having inside diameters ranging from .315 inch to 1.505 inches wherein the outer diameter of the body of the sealing plug ranged from about .035 to about .045 of an inch greater than the diameter of the bore to be sealed.

The engaging relationship of the sealing ribs 22 with the inner surface of the bore is further promoted by the convex configuration of the end wall 14 which projects axially and outwardly of the body 12. The convex, longitudinally protruding configuration of the end wall 14 is effective to increase the radial bearing pressure of the sealing ribs 22 and forward end of the body portion 12 against the inner surface of a bore in response to endwise pressure exerted against the end wall causing it to deflect inwardly from the position as shown in phantom in FIG. 3 to the position shown in solid lines. In the specific embodiment of the sealing plug 10 shown in the drawings, the end wall 14 is of a relatively flat symmetrical conical configuration which, upon the application of pressure to the outer surface thereof, has a tendency to flatten, exerting increased radial bearing pressure of the sealing ribs against the inner surface of the bore. By virtue of this novel construction, increases in the pressure of the fluid contained within an article sealed promote a more effective of the sealing plug in the bore.

To enhance the deformability characteristics of the body 12 of the sealing plug in addition to the axial flexing characteristics of the end wall 14 in repsonse to pressure applied thereto, the sealing plug 10 is preferably provided with an axially extending cavity 24 extending inwardly from the end remote from the end wall 14 as shown in the drawings forming therewith a generally cup-shaped plug as defined by an annular wall 26 and the end wall 14. The inner surface 28 of the end wall 14 is preferably spacd from the outer surface of the end wall 14 a distance corresponding substantially to the thickness of the cylindrical wall 26 of the body. The particular thickness of the annular wall 26 and the end wall 14 can be varied consistent with considerations of the particular flexing and resiliency characteristics of the material of which the sealing plug is comprised to provide the necessary strength and deformability characteristics to provide secure frictional engagement of the periphery of the sealing plug with the surface of the bore. Conventionally, a thickness of the end wall 14 and the annular wall 26 of the body when made of a vinyl plastic corresponding to about 20% of the outer diameter of the plug have provided exceptionally satisfactory sealing characteristics over a broad range of tubing diameters and internal pressures.

It will be apparent from the foregoing that the sealing plug 10 can be employed for providing a substantially fluid-type seal in circular bores and is particularly satisfactory for sealing the ends of tubing which has been preliminarily cleaned and filled with an inert gas in accordance with the method comprising the present invention. In accordance with this method, tubing such as the tube 18 fragmentarily shown in FIG. 3 either of a straight length or of a particular curved or bent preformed configuration is subjected to a cleaning operation whereby undesirable foreign matter, deposits and other contaminants such as oxidation scale, oils and lubricants employed during the manufacture of the tubing, dust, dirt and the like are removed from the interior surfaces of the bore 16 rendering the tubing in a commercially acceptable of cleanliness.

Any one of a number of well-known mechanical and chemical cleaning techniques or combinations can be employed for removing such undesirable deposits from the interior walls of the tubing. For example, suitable chemical cleaning steps such as an acid wash followed by a water rinse can be satisfactorily employed for removing undesirable deposits from the interior of the tubing. After the chemical treatment or other mechanical or combination treatments, the interior of the tubing is dried and the air and any residual moisture are thereafter purged therefrom by passing a stream of a relatively dry inert gas such as nitrogen, for example, through the tubing.

One end of the substantially dry purged tubing containing inert gas is thereafter sealed employing a sealing plug of the type shown in the drawings and further pressurization of the interior of the tubing is made in order that the pressure of the inert gas exceeds the atmospheric pressure to which the tubing will be exposed during shipment and subesquent storage. A positive pressure within the interior of the tubing is preferred so as to prevent any inward flow of air, dust and moisture into the interior thereof.

Pressurization of the interior of the cleaned and purged tubing with any one of a number of substantially dry, inert gases or mixtures thereof can be suitably accomplished by placing the entire tube or one open end thereof in a sealed pressure chamber containing the inert gas and thereafter inserting a sealing plug in the open end or ends of the tubing entrapping the pressurized gas in the interior of the tubing. Alternatively, and a preferred method of pressurizing the interior of the cleaned tubing comprises sealing the open ends of the purged tubing with a sealing plug of a resilient material, such as rubber, for example, having self-sealing characteristics. The interior of the sealed tubing is thereafter pressurized by inserting and piercing one of the sealing plugs with a hollow or tubular needle through which the pressurized inert gas is pumped into the interior of the tubing until the desired positive pressure is attained. The tubular needle is thereafter withdrawn and the self-sealing characteristics of the material of which the sealing plug is comprised seals the puncture in the plug retaining the pressurized inert gas in the interior of the tubing. In either case, a pressurized, hermetically sealed unit is provided which remains in such condition for substantially prolonged periods of time.

It will be apparent from the foregoing that the method comprising the present invention and the novel sealing plug as herein disclosed and described, provides an economical and effective method for maintaining the interior of hollow articles and particularly tubing in a high state of cleanliness for prolonged periods of time preventing oxidation attack or deposition of foreign matter on the interior surfaces thereof and simultaneously preventing contamination of the protective fluid atmosphere contained within the article.

While it will be apparent that the preferred embodiments herein illustrated are well calculated to fulfill the objects above stated, it will be appreciated that the invention is susceptible to modification, variation and change without departing from the proper scope or fair meaning of the subjoined claims.

What is claimed is:

1. A method for maintaining the interior of tubular members devoid of contamination and deposits for prolonged periods of time which comprises the steps of cleaning the interior of the members to remove undersirable deposits from the inner surfaces thereof, purging the interior of the cleaned said members with a substantially moisture-free inert fluid, and thereafter sealing said inert fluid in the interior of said members.

2. A method for maintaining the interior of tubing devoid of contamination and undesirable deposits for prolonged periods of time which comprises the steps of cleaning the interior surfaces of the tubing to remove undesirable deposits therefrom, drying and purging the interior of the cleaned said tubing, introducing a substantially moisture-free inert fluid into the tubing, and thereafter sealing said inert fluid within the interior of said tubing.

3. A method for maintaining the interior of tubing devoid of contamination and moisture for prolonged periods of time which comprises the steps of cleaning the interior of the tubing to remove foreign matter from the inner surfaces thereof, drying the interior of said tubing to remove substantially all of the moisture therefrom, purging the interior of the dried and cleaned said tubing with a substantially moisture-free inert fluid, and thereafter sealing the ends of said tubing to entrap said inert fluid therein at a pressure greater than the pressure of the surrounding atmosphere.

4. A method for maintaining the interior of refrigeration and air conditioning tubing devoid of contamination and moisture for prolonged periods of time which comprises the steps of cleaning the interior of the tubing to remove foreign matter from the inner surfaces thereof, drying the interior of the cleaned said tubing, pressurizing the interior of said tubing with an inert fluid to a pressure above atmospheric pressure, and thereafter sealing said pressurized inert fluid within the interior of said tubing.

References Cited by the Examiner

UNITED STATES PATENTS

| | | | |
|---|---|---|---|
| 2,714,447 | 8/1955 | Gardes | 206—46 |
| 2,746,632 | 5/1956 | Bramming | 215—52 |
| 3,021,975 | 2/1962 | Sarafinas | 215—52 X |
| 3,080,269 | 3/1963 | Pollock et al. | 156—294 X |
| 3,115,010 | 12/1963 | Collier | 53—7 X |

EARL M. BERGERT, *Primary Examiner.*

P. DIER, *Assistant Examiner.*